United States Patent [19]
Ellis

[11] Patent Number: 6,122,418
[45] Date of Patent: Sep. 19, 2000

[54] CHROMATIC DISPERSION COMPENSATING NODE

[75] Inventor: Andrew D Ellis, Ipswich, United Kingdom

[73] Assignee: British Telecommunications, London, United Kingdom

[21] Appl. No.: 09/142,134

[22] PCT Filed: Mar. 5, 1997

[86] PCT No.: PCT/GB97/00616

§ 371 Date: Sep. 2, 1998

§ 102(e) Date: Sep. 2, 1998

[87] PCT Pub. No.: WO97/37446

PCT Pub. Date: Oct. 9, 1997

[30] Foreign Application Priority Data

Mar. 29, 1996 [GB] United Kingdom ............... 9606671
May 15, 1996 [EP] European Pat. Off. ........... 96303452

[51] Int. Cl.$^7$ .................................................. G02B 6/26
[52] U.S. Cl. ........................... 385/27; 385/16; 385/24; 385/37; 385/47; 359/128; 359/130; 359/139
[58] Field of Search ............................... 385/27, 16, 20, 385/21, 45, 24, 46, 31, 47, 37, 123, 124; 359/161, 135, 128, 130, 139

[56] References Cited

U.S. PATENT DOCUMENTS 5,048,909  9/1991  Henry ........................................ 385/27
5,701,188  12/1997  Shigematsu et al. ................... 359/161
5,943,151  8/1999  Grasso et al. ........................... 359/161

FOREIGN PATENT DOCUMENTS 0 591 042  4/1994  European Pat. Off. .

OTHER PUBLICATIONS

Electronics Letters, vol. 31, No. 11, May 25, 1995, pp. 899–901, Quellette et al., "Broadband and WDM Dispersion Compensation Using Chirped Sampled Fibre Bragg Gratings".

*Primary Examiner*—Phan T. H. Palmer
*Attorney, Agent, or Firm*—Nixon & Vanderhye P.C.

[57] ABSTRACT

Wavelength division multiplexed transmission line functions of chromatic dispersion compensation and channel drop are performed by a node having a concatenated series of wavelength selective dispersion compensating elements and switches. The switches are arranged to selector or bypass each wavelength selective dispersion compensating element. If a wavelength selective dispersion compensating element is appropriately selected, the corresponding channel is dispersion compensated and reflected to a drop port. Any remaining channels are circulated by the switches to the remaining dispersion compensating elements where they are dispersion compensated and reflected to an optical output. In the preferred examples, the node includes an insert port to allow multiplexing of additional channels. This allows the node to perform both drop and insert functions in addition to dispersion compensation and so forms a dispersion compensating drop and insert node.

20 Claims, 7 Drawing Sheets

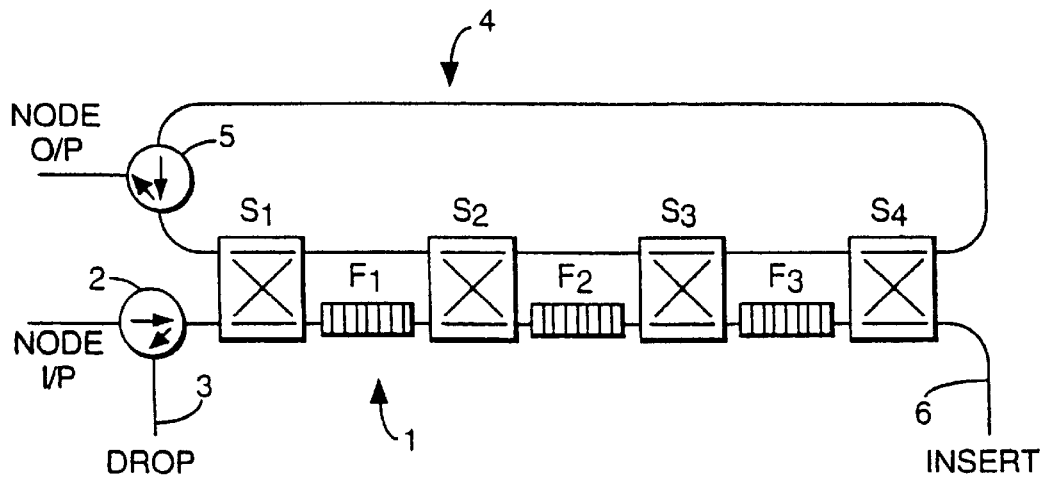
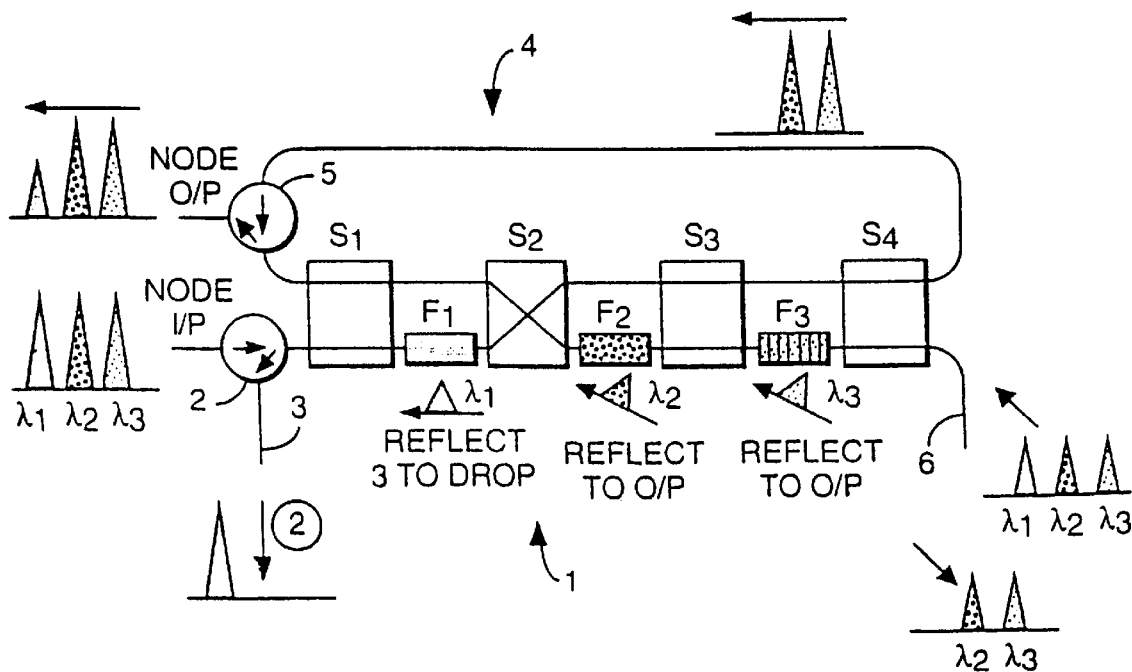

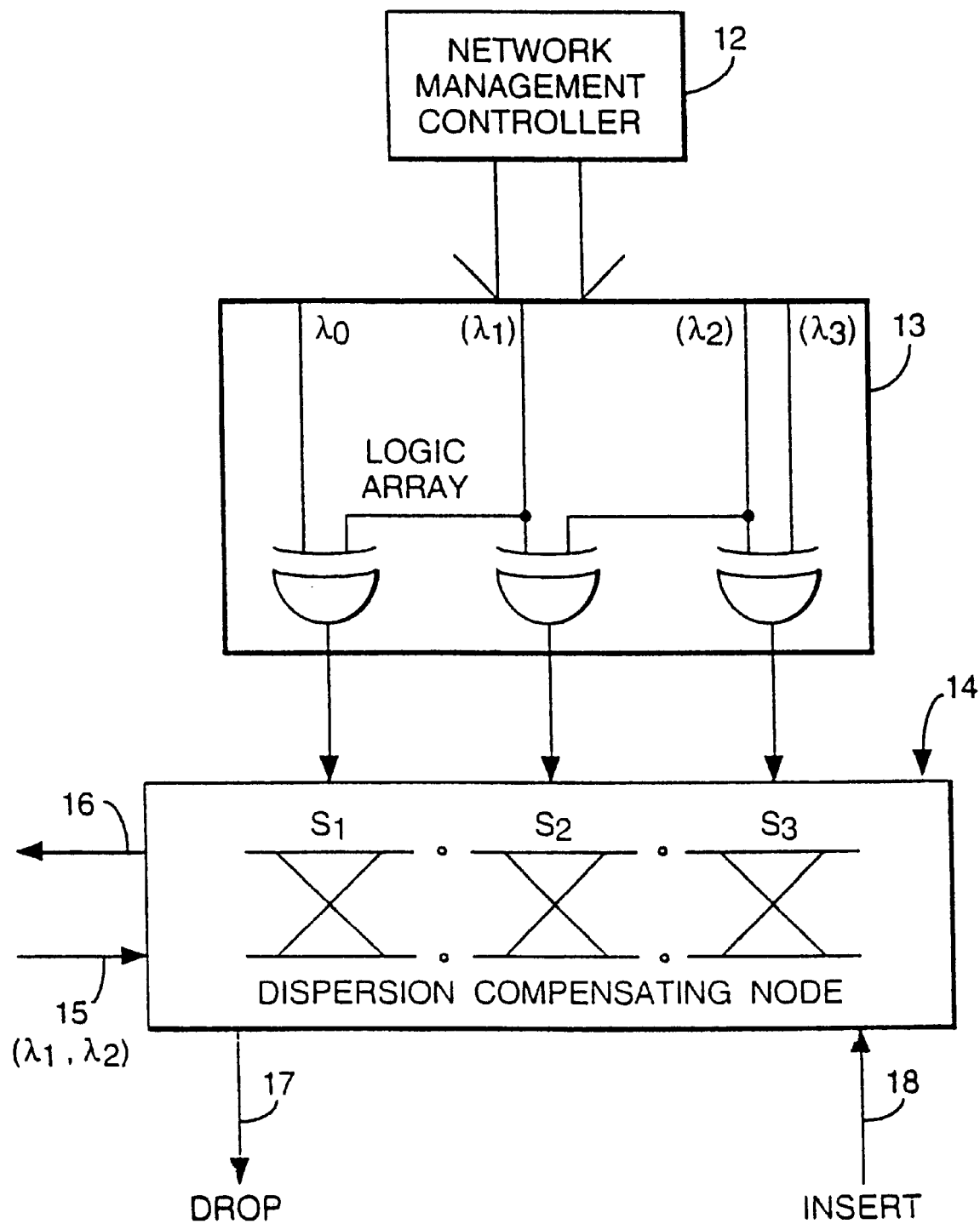

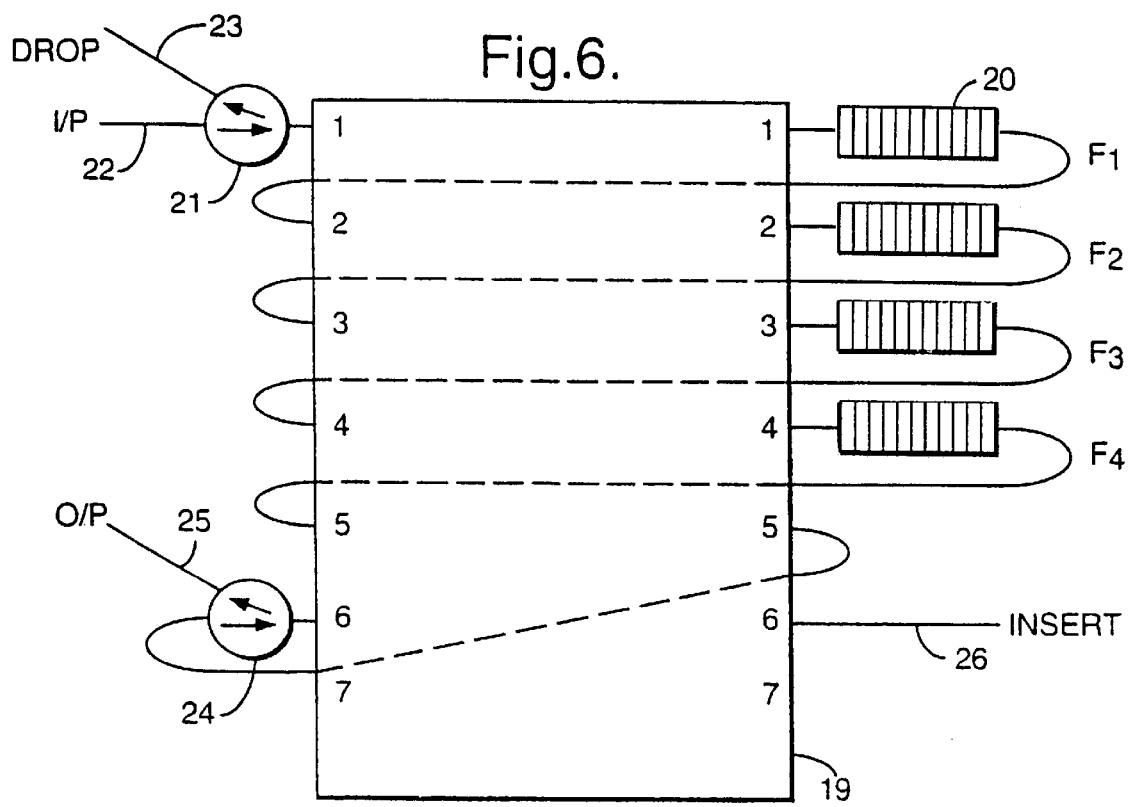
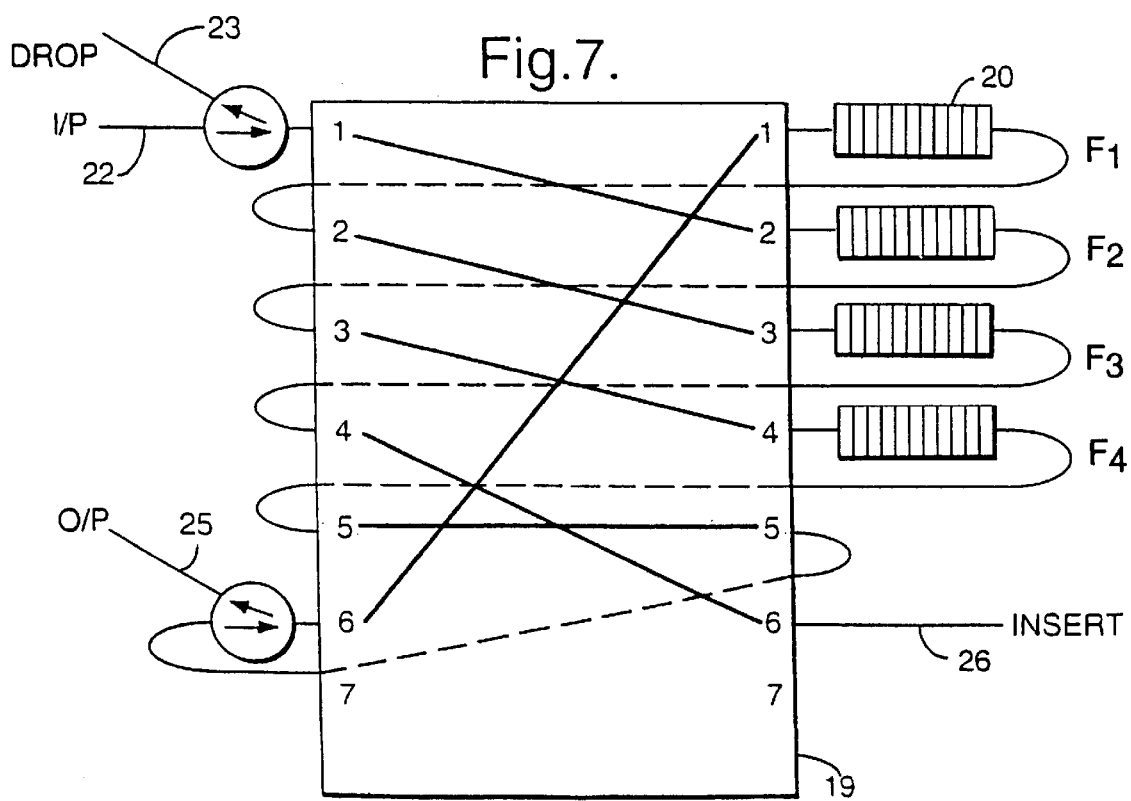

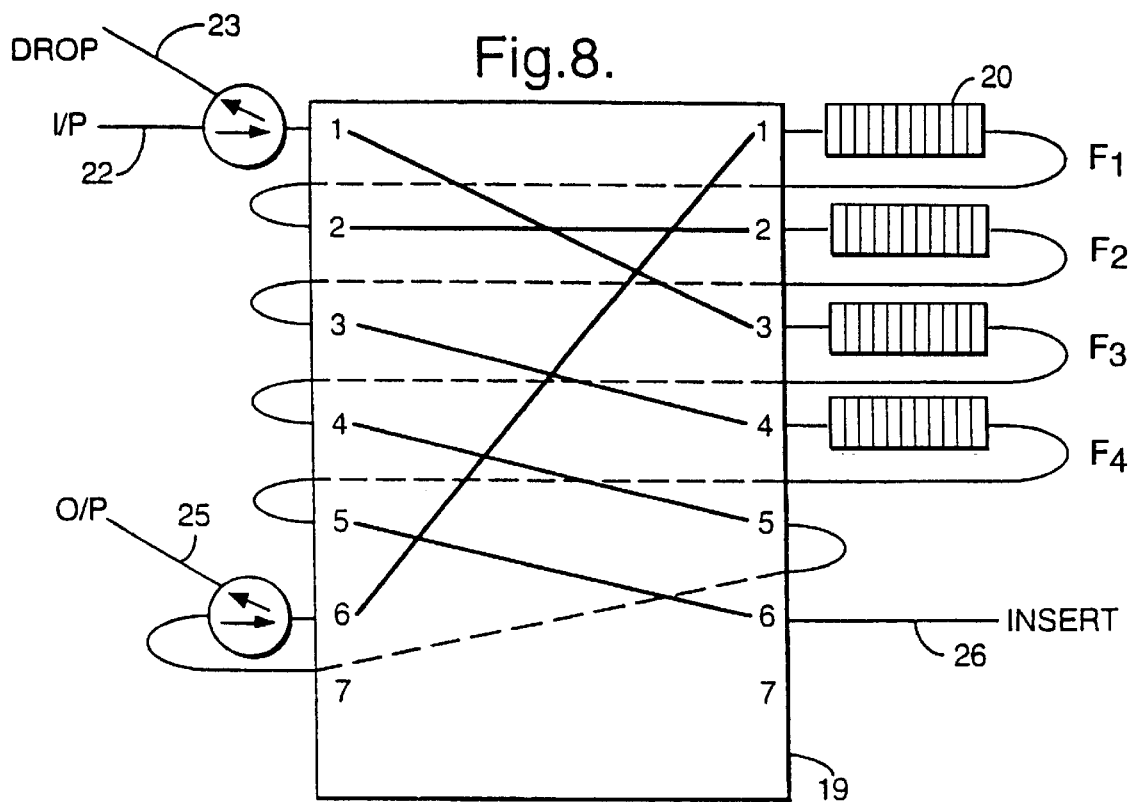
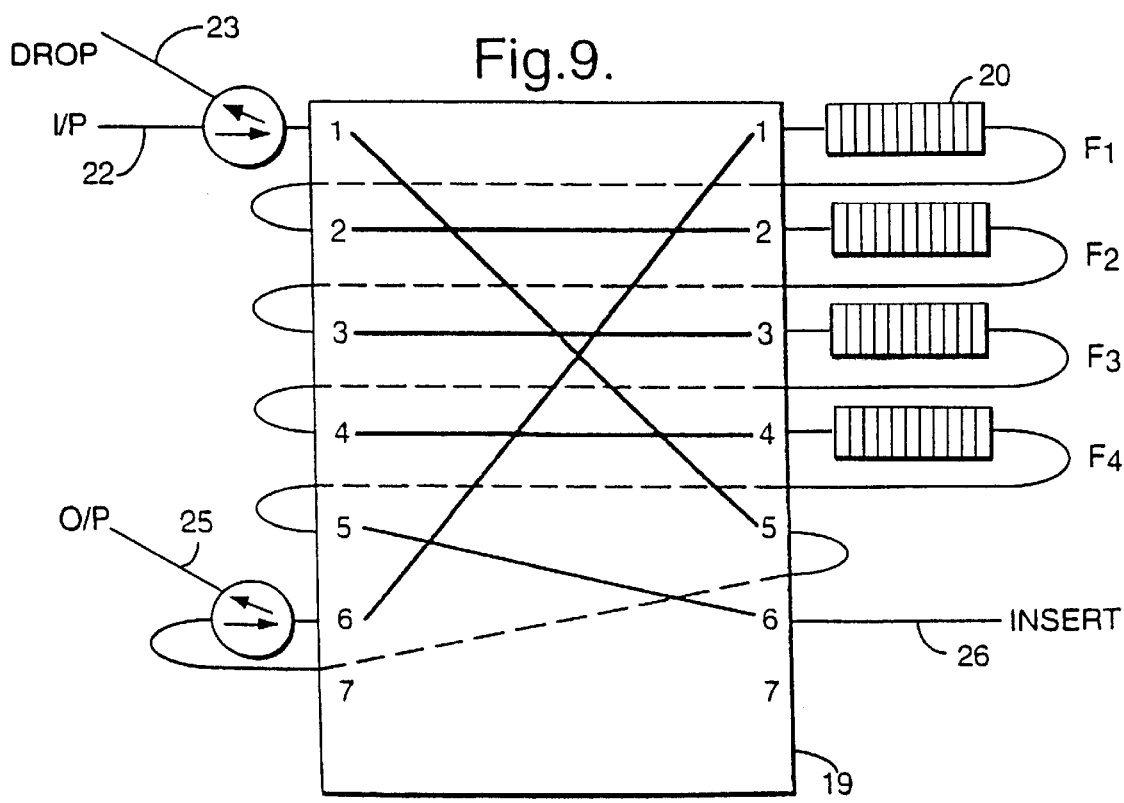

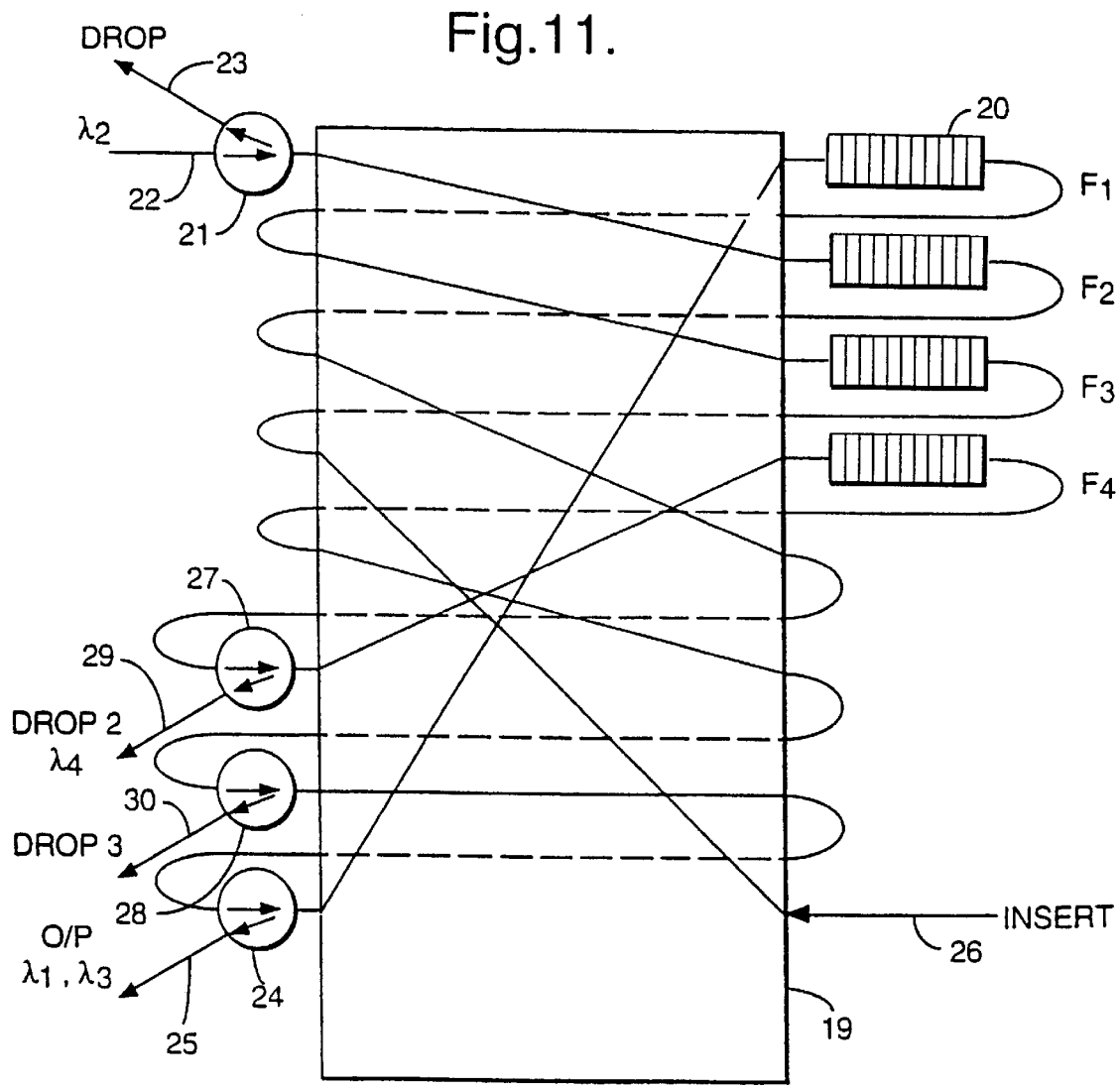

CHROMATIC DISPERSION COMPENSATING NODE

TECHNICAL FIELD

1. Field of the Invention

The present invention relates to a structure for dispersion compensating a wavelength division multiplexed (WDM) signal in an optical network.

2. Background Art

The most efficient use of the available optical communication bandwidth can be achieved by multiplexing a number of different optical communication channels over a single optical fibre. One of the most promising multiplexing schemes is WDM in which channels have different wavelengths. In addition to increasing the capacity on any individual point to point communication link, it is known that such optical multiplexing offers many potential advantages in the provision of coarse traffic routing, simplified switching architectures and advanced restoration facilities. In high speed WDM optical networks using embedded standard fibre, chromatic dispersion is a key limiting factor. A number of techniques for compensating chromatic dispersion are known. In one conventional technique, fibre gratings are used to perform dispersion compensation. Other techniques include the use of dispersion compensating fibre or dispersion tolerant transmission formats.

Optical multiplexers/demultiplexers are provided in WDM networks to drop or insert one or more wavelengths at a node. Again, it is known that fibre gratings may be used to perform this drop and insert function.

At present, dispersion compensation and drop and insert functions in WDM networks are carried out separately. Furthermore, any flexibility in routing is provided by a further functional block including electro-optic switches or electro-mechanical optical switches. Accordingly, at present at least three functional blocks are required in a given system.

The document U.S. Pat. No. 5,048,909 discloses a chromatic dispersion compensating device having a chirped fibre grating for selectively dropping and dispersion compensating one channel within a WDM optical signal.

SUMMARY OF THE INVENTION

According to a first aspect of the present invention, a chromatic dispersion compensating node for connection to a transmission medium carrying a wavelength division multiplexed optical signal having N channels corresponding to N different wavelengths, comprises:

an optical input;
an optical output;
at least one drop port; and,
switching means for selectively coupling each of a series of N wavelength selective dispersion compensating elements, each of which is tuned to a respective one of the N wavelengths, to one of the drop port and the output port, the node thereby selectively dropping one or more of the N channels and dispersion compensating all of the N channels.

According to a second aspect of the present invention, an optical communication network comprises a number of chromatic dispersion compensating nodes in accordance with the first aspect of the present invention.

In the present invention, wavelength division multiplexed transmission functions of chromatic dispersion compensation and channel drop are performed by a node having a number of wavelength selective dispersion compensating elements and switching means. The switching means is arranged to select or bypass each wavelength selective dispersion compensating element. If a wavelength selective dispersion compensating element is selected, the corresponding channel is dispersion compensated and reflected to one of a number of drop ports. Any remaining channels are circulated by the switching means to the remaining dispersion compensating elements where they are dispersion compensated and reflected to the optical output.

Preferably, the node includes an insert port to allow multiplexing of additional channels. This allows the node to perform both drop and insert functions in addition to dispersion compensation and so forms a dispersion compensating drop and insert node.

Preferably, the wavelength selective compensating elements are chirped fibre gratings. These fibre gratings are reflective and may be tuned to a desired wavelength corresponding to one of the N channels. As each of the chirped fibre gratings is independent, characteristics of the fibre gratings can be tailored to suit particular transmission formats of that channel. Thus each channel may offer services at different bit rates and with different modulation schemes, examples of which include standard NRZ binary formats and RZ optically time division multiplexed formats. Furthermore, each grating may be individually tuned in dispersion to allow for variations in transmission line dispersion with wavelength.

Preferably, the optical input, optical output and drop ports are optical circulators. Power splitters and optical isolators are alternatives.

In a first preferred example, the switching means comprises a series of discrete 2×2 non-blocking optical switches. In second and third preferred examples, a single MxN multi-point switch is used.

Preferably, the switching state of each of the switches is controlled by a network node controller. The network node controller determines the switch configuration to perform the routing of the received channels. The network node controller may be local or remote.

Where necessary, additional optical amplifiers may be used to boost signal power and thereby overcome any loss problems associated with the switching elements.

According to a third aspect of the present invention, a cross-point switch for an optical network comprises two chromatic dispersion compensating nodes according to the first aspect of the present invention, in which a drop port of each node is connected to the other node.

The drop ports of the two cross-connected dispersion compensating nodes of the first aspect of the present invention are used to perform an insert function to route a channel from one transmission line to another. Preferably, the drop port of one node is connected to the insert port of the other node.

In one embodiment, corresponding switches in the two connected nodes are arranged to be set to the same switch state to ensure that the same wavelengths are exchanged. In this configuration, all channels are dispersion compensated only once.

In another embodiment, the switch states of corresponding switches are independent of each other and an optical circulator is provided in each of the drop ports connecting the two nodes to provide a local drop facility.

In the present application the term "corresponding switches" are those switching elements within two dispersion compensating nodes which have the effect of coupling a wavelength selective dispersion-compensating element tuned to a particular channel to the optical output or a drop port so that the two nodes mirror each other's behaviour.

According to a fourth aspect of the present invention, an optical communication network comprises a number of cross-point switches in accordance with the third aspect of the present invention.

According to a fifth aspect of the present invention, an optical communication network comprises a combination of one or more chromatic dispersion compensating nodes according to the first aspect of the present invention and one or more cross-point switches according to the third aspect of the present invention.

BRIEF DESCRIPTION OF DRAWINGS

The present invention will now be described, by way of example only, with reference to the accompanying drawings, in which:

FIG. 1 shows a block diagram of a first example of a dispersion compensating node for a three channel optical fibre transmission line;

FIG. 2 illustrates a drop and insert operation of the dispersion compensating node of FIG. 1;

FIG. 5 shows a block diagram of a network element incorporating a dispersion compensating node;

FIG. 6 shows a block diagram of a second example of a dispersion compensating node;

FIGS. 7 to 9 illustrate a number of operating states of the dispersion compensating node of FIG. 6;

DETAILED DESCRIPTION

Figure 3:
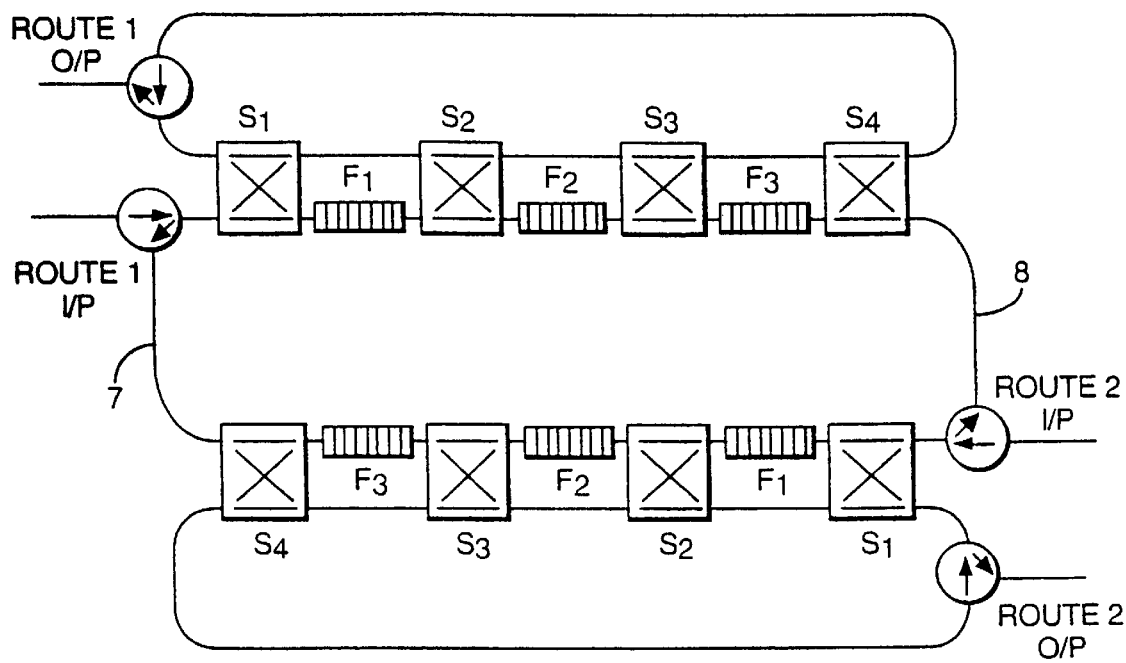
FIG. 3 shows a block diagram of a first example of a cross-point switch incorporating two cross-connected dispersion compensating nodes.

FIG. 1 shows a schematic diagram of the present invention for a three channel optical transmission line. The dispersion compensation node comprises a first optical fibre 1 having an optical circulator input 2 which provides a drop port 3, and a second optical fibre 4 having an optical circulator output 5 which provides a return path to the first optical fibre 1. The first optical fibre 1 includes a concatenated series of 2×2 non-blocking switches $S_1$–$S_4$ and chirped fibre gratings $F_1$–$F_3$, each of which is tuned to a respective one of the three possible wavelengths $\lambda_1$–$\lambda_3$. The optical circulator input 2 serves as a drop port 3 and the free end of the optical fibre of the first optical fibre 1 is utilised as an insert port 6. An example of a suitable switch is the JDS Fitel SR 22 switch. Suitable fibre gratings are described by Raman Kashap et al in a paper entitled "A novel method of producing all fibre photo-induced chirped gratings", Electronic Letters, 1994. These gratings, unlike conventional fibre gratings, have a distributed period. Finally, an example of an optical circulator is the JDS Fitel CR 1500 optical circulator.

Channels to be reflected are selected by the appropriate switch to the left of the respective grating. The final switch $S_4$ ensures that any remaining channels are circulated around the second optical fibre 4 and optical circulator 5 to the input of the chain of fibre gratings. The switch positions then ensure that all of the remaining wavelengths are reflected back to the optical circulator output 5 by the previously unused fibre gratings. In this manner, all three channels of the transmission line are reflected from a respective fibre grating and are thus dispersion compensated, and are directed either to the optical output 5 or drop port 3.

If a signal is input to the insert port 6, any channels corresponding to those previously dropped from the drop port 3 are directed to the output circulator 5, thus performing an insert function, whilst any channels not previously dropped are reflected straight back to the insert port 6 from the appropriate fibre grating.

An example of the operation of the dispersion compensation node of FIG. 1 is shown in FIG. 2.

A three channel WDM signal in an optical transmission line is received at the first input circulator 2. Channel 1 ($\lambda_1$) is reflected from the first grating $F_1$ in a first optical path whilst channels 2 ($\lambda_2$) and 3 ($\lambda_3$) pass through unmodified. Channel 1 is thus dispersion compensated and directed to the drop port 3 by the optical circulator input 2. The switch $S_2$ is set so that channels 2 and 3 bypass their fibre grating $F_2$ and $F_3$, respectively, circulated around the second optical fibre 4, and are subsequently reflected back to the optical circulator output 5 via switch $S_2$ by their respective gratings in a second optical path. Accordingly, channels 2 and 3 are dispersion compensated and routed to the node output 5.

A WDM signal input to the insert port 6 can replace channels which have previously been dropped. For example, with the switch states shown, a signal introduced at the insert port 6 corresponding to channel 1 passes through gratings $F_2$ and $F_3$ undisturbed and emerges at the optical circulator output 5. However, channels 2 and 3 will be reflected from their respective gratings and will return to the insert port 6.

Additional channels may be added simply by inserting an additional 2×2 switch and an appropriate chirped fibre grating.

FIG. 3 shows an extension of the dispersion compensation node of FIGS. 1 and 2 to provide a 2×2 cross-point switch. The cross-point switch comprises two identical nodes with the drop port fibres 7 and 8 of each dispersion compensation node cross-connected to the first optical fibre 1 of the other i.e. the drop ports 3 and insert ports 6 of the two nodes are cross-connected. In this example, corresponding switches of the device, i.e those with the same switch numbers, are set to the same state to ensure that the same channel is exchanged by the two halves of the cross connect. Corresponding chirped fibre gratings are tuned to reflect the same channel ($\lambda$), but the degree of dispersion compensation provided by each grating may be tuned to take account of the individual transmission line dispersion characteristics.

Figure 4:
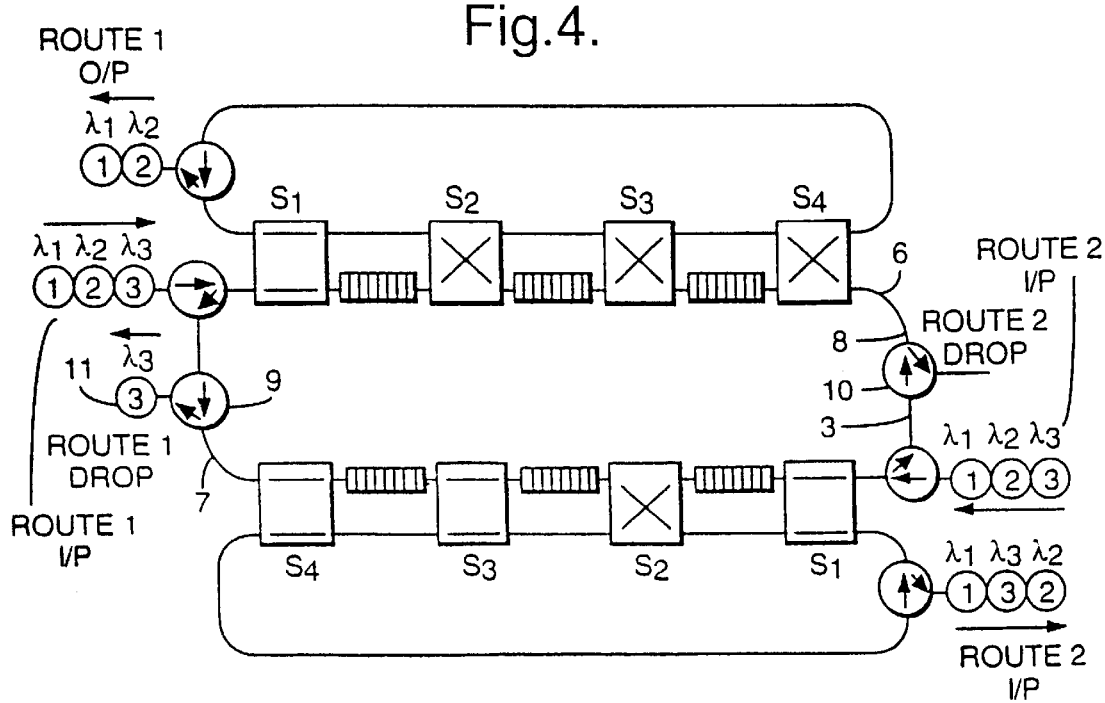
FIG. 4 shows a block diagram of a second example of a cross-point switch incorporating two cross-connected dispersion compensating nodes.

In the example in FIG. 3, no spare connection exists for local drop and insert. However, by allowing corresponding switches to adopt different switch states and providing optical circulators 9 and 10 (see FIG. 4) in the connecting optical fibres 7 and 8, it is possible to implement a local drop function. FIG. 4 illustrates an example where optical circulators 9 and 10 are provided to achieve this. In this example, channel 3 on the first compensating node is dropped. The drop is set by arranging the first dispersion compensating node to drop channel 1 and 3 and the second dispersion compensating node to drop channel 1. As channel 1 on the first dispersion compensating node is dropped, the insert port 6 on this node will accept channel 1 from the drop port 3 of the second dispersion compensating node. However, as channel 3 has not been dropped from the second dispersion compensating node, when this channel is offered to the insert port 6 of the second dispersion compensating node it is reflected to the local drop port 11 of the optical circulator 9 as shown in the FIGURE. In this embodiment, it is important that the reflectivity of the chirped fibre gratings is sufficient to ensure that the dropped channels do not degrade the performance of other channels of the same wavelength through cross-talk.

The truth tables dictating the switch state for a 2 channel and a 3 channel dispersion compensating node which implements both drop and insert functions are shown below in Table 1 and Table 2, respectively, where the wavelength routings are represented logically as:
 "0"=transmitted
 "1"=reflected (dropped)
and the switch settings are represented logically as:
 "0"=bar
 "1"=cross

TABLE 1

| Wavelength | | Switch | | |
|---|---|---|---|---|
| 1 ($\lambda_1$) | 2 ($\lambda_2$) | $S_1$ | $S_2$ | $S_3$ |
| 0 | 0 | 1 | 0 | 0 |
| 0 | 1 | 1 | 1 | 1 |
| 1 | 0 | 0 | 1 | 0 |
| 1 | 1 | 0 | 0 | 1 |

TABLE 2

| Wavelength | | | Switch | | | |
|---|---|---|---|---|---|---|
| 1 ($\lambda_1$) | 2 ($\lambda_2$) | 3 ($\lambda_3$) | $S_1$ | $S_2$ | $S_3$ | $S_4$ |
| 0 | 0 | 0 | 1 | 0 | 0 | 0 |
| 0 | 0 | 1 | 1 | 0 | 1 | 1 |
| 0 | 1 | 0 | 1 | 1 | 1 | 0 |
| 0 | 1 | 1 | 1 | 1 | 0 | 1 |
| 1 | 0 | 0 | 0 | 1 | 0 | 0 |
| 1 | 0 | 1 | 0 | 1 | 1 | 1 |
| 1 | 1 | 0 | 0 | 0 | 1 | 0 |
| 1 | 1 | 1 | 0 | 0 | 0 | 1 |

From the above tables, it is possible to deduce the following:

$S_1$=NOT ($\lambda_1$)=XOR ($\lambda_1$,1)
$S_2$=XOR ($\lambda_1$, $\lambda_2$)
$S_3$=XOR ($\lambda_2$, $\lambda_3$)
$S_4$=$\lambda_3$=XOR ($\lambda_3$, 0)

and therefore for switch n of N wavelengths (channels):
$S_n$=$\lambda_{n-1}$ XOR $\lambda_n$
$\lambda_o$=1, $\lambda_{n+1}$=0

This allows the switch configuration to be determined for an arbitrary number of wavelengths in the drop and insert configuration.

FIG. 5 shows a block diagram of a system for implementing dispersion compensation and drop and insert functions in a two channel transmission line. The system comprises a network node controller 12, an XOR logic array 13, and a dispersion compensation node 14 having an optical input 15, an optical output 16, a drop port 17 and an insert port 18. The network management controller 12 controls the state of the switches $S_1$–$S_3$ within the dispersion compensating node 14 through the XOR logic array 13. Setting an input to channel 1 ($\lambda_1$) or channel 2 ($\lambda_2$) to logic "1" in the logic array means that the channel is to be dropped to the drop port 17. Channel 0 ($\lambda_0$) and channel 3 ($\lambda_3$) of the XOR logic array 13 are held at logic "1" and "0", respectively, to implement the required switch settings.

FIG. 6 shows a second example of the present invention where the dispersion compensating node is formed from a single multipoint switch 19 and a number of chirped fibre gratings 20. An example of a suitable switch is that sold under the trade name JDS Fitel SG Series MxN Single Mode Matrix Switch. As shown, the outputs of each fibre grating 20 are connected to the input of the succeeding switching element within the multipoint switch 19. The inputs of each of the switching elements are selectively connectable to any of the outputs of the switching elements to perform the required dispersion compensation and any drop and insert function.

An optical circulator 21 is connected to the input of the first switching element and so provides an optical input 22 and a drop port 23. A further optical circulator 24 forms an optical output 25. The output of the sixth switching element provides an insert port 26.

FIG. 7 shows the switch states for an operation which performs dispersion compensation for each of four channels received at the optical input 22 and drops channels 2 and 4.

The switch states are selected so that the chirped fibre gratings $F_2$ and $F_4$ are within a first optical path. Channels 2 and 4 are dispersion compensated in this first optical path and reflected to the drop port 23. The remaining channels pass through these fibre gratings undisturbed and are circulated to a second optical path which includes chirped fibre gratings $F_1$ and $F_3$ where channels 1 and 3, respectively, are dispersion compensated and reflected to the optical output 25. As in the first example of the present invention, if required, channels 2 and 4 can be introduced at the insert port 26 from a second transmission line to perform a multiplexing operation. Again, any channels introduced at the insert port 26 which have not been previously dropped will be reflected by their corresponding chirped fibre grating 20 and returned to the insert port 26.

FIG. 8 illustrates the dispersion compensation of all four channels received at the optical input 22 and a drop operation with respect to channel 3.

FIG. 9 shows the dispersion compensation of all four channels received at the optical input 22 and transmission of all four channels to the optical output port 25.

Figure 10:
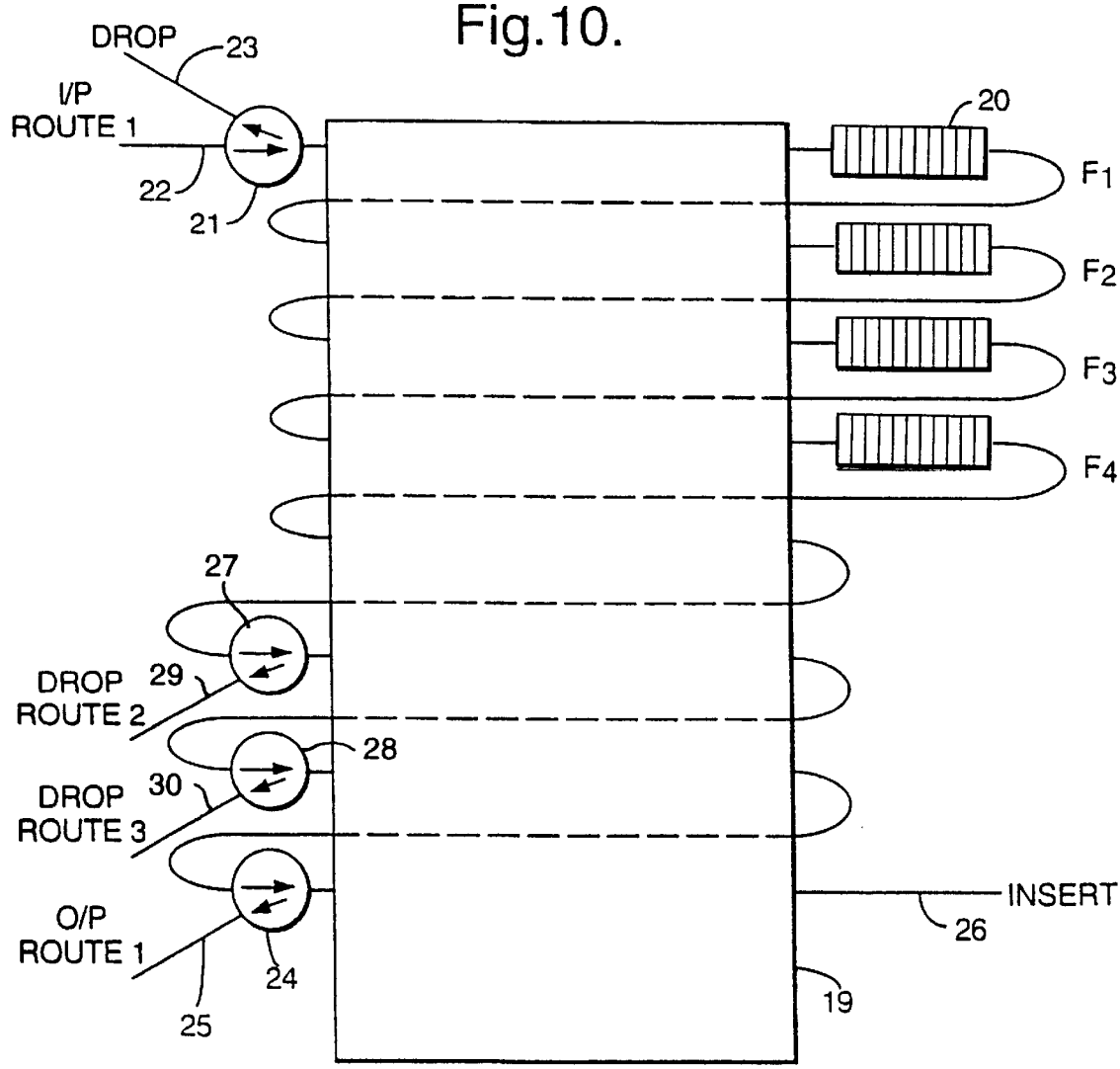
FIG. 10 shows a block diagram of a third example of a dispersion compensating node; and, FIG. 11 shows an example of an operating state of the dispersion compensating node of FIG. 10.

FIG. 10 shows a third example of the present invention which is an extension of the multipoint switch architecture of the second example described with reference to FIGS. 6 to 10 of the accompanying drawings. In this third example, in addition to the drop port 23 and output port 25, second and third optical circulators 27 and 28, respectively, are provided as drop ports 29 and 30, respectively. This allows the dispersion compensating node to drop channels to more than one other transmission line for routing across an optical network.

FIG. 11 shows the switch states for an operation which performs dispersion compensation for each of four channels received at the optical input 22 and drops channel 2 ($\lambda_2$) from drop port 23, drops channel 4 ($\lambda_4$) from drop port 29, and transmits channel 1 ($\lambda_1$) and channel 3 ($\lambda_3$) from the optical output 25. Again, insert port 26 is arranged to multiplex channels from other transmission lines (not shown). In this example, drop port 30 is unused.

As shown, the switch states in the dispersion compensating node of FIG. 11 are selected so that the chirped fibre grating $F_2$ is in a first optical path, chirped fibre grating $F_4$ is in a second optical path, and chirped fibre gratings $F_1$ and $F_3$ are in a third optical path. Channels tuned to any of the one or more chirped fibre gratings in a particular optical path are reflected by a respective chirped fibre grating to whichever of the optical circulators is coupled via the switching elements to the one or more chirped fibre gratings in that path. Channels which are transmitted undisturbed through chirped fibre gratings in an optical path are circulated to the next optical path. In this manner, all of the received channels are circulated within the dispersion compensating node until they reach a corresponding chirped fibre grating and are reflected to the optical output or a drop port, as determined by the switch states.

What is claimed is:

1. A chromatic dispersion compensating node for connection to a transmission medium carrying a wavelength division multiplexed optical signal having N channels corresponding to N different wavelengths, said node comprising:

(a) an optical input;

(b) an optical output;

(c) at least one drop port;

(d) a series of N wavelength selective dispersion compensating elements, each of which is tuned to a respective one of N wavelengths, the dispersion compensating elements thereby dispersion compensating all of the N wavelength channels; and (e) switching means for selectively coupling in a configurable manner each of the N wavelength selective dispersion compensating elements to one of the drop port and the optical output, the node thereby selectively dropping one or more of the N channels.

2. A dispersion compensating node according to claim 1, in which the wavelength selective compensating elements are chirped fibre gratings.

3. An optical communication network comprising a number of chromatic dispersion compensating nodes in accordance with claim 1.

4. A chromatic dispersion compensating node for connection to a transmission medium carrying a wavelength division multiplexed optical signal having N channels corresponding to N different wavelengths, said node comprising:

(a) an optical input;

(b) an optical output;

(c) at least one drop port; and, (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;

said node further comprising an insert port.

5. A chromatic dispersion compensating node for connection to a transmission medium carrying a wavelength division multiplexed optical signal having N channels corresponding to N different wavelengths, said node comprising:

(a) an optical input;

(b) an optical output;

(c) at least one drop port; and, (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;

said node comprising a first optical path and a second optical path, wherein the switching means are arranged selectively to switch a number of the wavelength selective dispersion compensating elements into the first optical path and selectively switch a number of the remaining wavelength selective dispersion compensating elements into the second optical path, so that signals reflected from dispersion compensating elements in the first optical path are coupled to one of the drop port and the optical output, one or more signals transmitted by the dispersion compensating elements in the first optical path are circulated within the node onto others of the dispersion compensating elements in the second optical path, and signals reflected from dispersion compensating elements in the second optical path are coupled to the other of the optical output and the drop port.

6. A chromatic dispersion compensating node for connection to a transmission medium carrying a wavelength division multiplexed optical signal having N channels corresponding to N different wavelengths, said node comprising:

(a) an optical input;

(b) an optical output;

(c) at least one drop port; and, (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;

wherein the optical input and optical output are optical circulators.

7. A chromatic dispersion compensating node for connection to a transmission medium carrying a wavelength division multiplexed optical signal having N channels corresponding to N different wavelengths, said node comprising:

(a) an optical input;

(b) an optical output;

(c) at least one drop port; and, (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;

wherein the switching means are a number of discrete 2×2 non-blocking optical switches.

8. A chromatic dispersion compensating node for connection to a transmission medium carrying a wavelength division multiplexed optical signal having N channels corresponding to N different wavelengths, said node comprising:

(a) an optical input;

(b) an optical output;

(c) at least one drop port; and, (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;

wherein the switching means comprises an MxN multi-point switch.

9. A chromatic dispersion compensating node for connection to a transmission medium carrying a wavelength division multiplexed optical signal having N channels corresponding to N different wavelengths, said node comprising:
   (a) an optical input;
   (b) an optical output;
   (c) at least one drop port; and,
   (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;
   said node comprising a concatenated series of N wavelength selective dispersion compensating elements and switching means.

10. A chromatic dispersion compensating node for connection to a transmission medium carrying a wavelength division multiplexed optical signal having N channels corresponding to N different wavelengths, said node comprising:
   (a) an optical input;
   (b) an optical output;
   (c) at least one drop port; and, (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;
   wherein said node comprises a plurality of drop ports.

11. An optical communication network comprising:
   a plurality of chromatic dispersion compensating nodes, each node being for connection to a transmission medium carrying a wavelength division multiplexed optical signal having N channels corresponding to N different wavelengths, said node comprising:
   (a) an optical input;
   (b) an optical output;
   (c) at least one drop port; and,
   (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels; and
   a network node controller for controlling the switch state of each of the switching elements.

12. A cross-point switch for an optical network comprising:
   two chromatic dispersion compensating nodes, each node being for connection to a transmission medium carrying a wavelength division multiplexed optical signal having N channels corresponding to N different wavelengths, said node comprising:
   (a) an optical input;
   (b) an optical output;
   (c) at least one drop port; and,
   (d) switching means for selectively coupling, each of a series of N wavelength selective dispersion compensating elements, each of which is tuned to a respective one of the N wavelengths, to one of the drop port and the optical output, the node thereby selectively dropping one or more of the N channels and dispersion compensating all of the N channels;
   in which a drop port of each node is connected to an optical path of the other node.

13. A cross-point switch according to claim 12, in which a drop port of one node is connected to an insert port of the other node.

14. A cross-point switch according to claim 12, in which the switch states of the switching means in the two connected nodes are dependent upon each other.

15. A cross-point switch according to claim 12, in which the switch states of the switching means are independent of each other.

16. A cross-point switch according to claim 15, in which the drop ports include optical circulators to provide a local drop facility.

17. An optical communication network comprising a number of cross point switches in accordance with claim 12.

18. An optical communication network comprising:
   a combination of at least one chromatic dispersion compensating nodes, each node being for connection to a transmission medium carrying a wavelength division multiplexed optical signal having N channels corresponding to N different wavelengths, said node comprising:
   (a) an optical input;
   (b) an optical output;
   (c) at least one drop port; and,
   (d) switching means for selectively coupling each of a series of N wavelength selective dispersion compensating elements, each of which is tuned to a respective one of the N wavelengths, to one of the drop port and the optical output, the node thereby selectively dropping one or more of the N channels and dispersion compensating all of the N channels; and
   at least one cross-point switch in which a drop port of each node is connected to an optical path of another node.

19. A method of dispersion compensating an optical signal having N channels corresponding to N different wavelengths, said method comprising the steps of:
   (a) introducing the optical signal to an optical input;
   (b) communicating the optical signal from the optical input to a series of N wavelength selective dispersion compensating elements each of which is tuned to a respective one of N wavelengths, the dispersion compensating elements thereby dispersion compensating all of the N wavelength channels; and
   (c) selectively coupling in a configurable manner each of the N wavelength selective dispersion compensating elements to one of a drop port and an optical output the node thereby selectively dropping one or more of the N channels.

20. A method of dispersion compensating an optical signal having N channels corresponding to N different wavelengths, comprising the steps of:
   (a) selectively coupling each of a series of N wavelength selective dispersion compensating elements, each of which is tuned to a respective one of the N wavelengths, to one of a drop port and an optical output;
   (b) introducing the optical signal to an optical input, thereby selectively dropping one or more of the N channels and dispersion compensating all of the N channels;

(c) selectively switching a number of the wavelength selective dispersion compensating elements into a first optical path; and (d) selectively switching a number of the remaining wavelength selective dispersion compensating elements into a second optical path, wherein signals reflected from dispersion compensating elements in the first optical path are coupled to one of the drop port and the optical output, one or more signals transmitted by the dispersion compensating elements in the first optical path are circulated onto others of the dispersion compensating elements in the second optical path, and signals reflected from dispersion compensating elements in the second optical path are coupled to the other of the optical output and the drop port.

* * * * *